Figure 1:
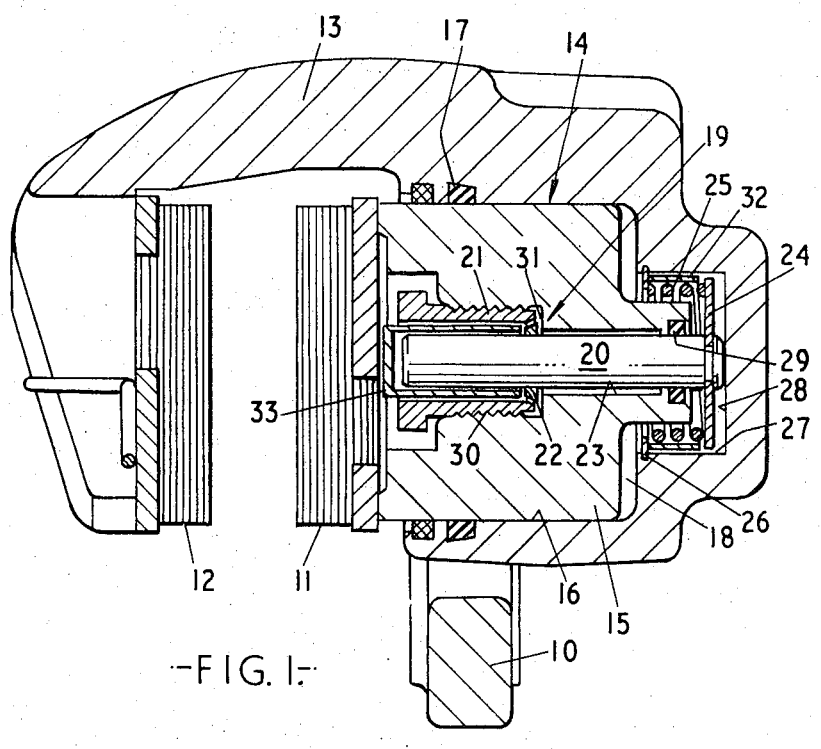

United States Patent [19]
Morris

[11] 3,860,095
[45] Jan. 14, 1975

[54] VEHICLE BRAKES
[75] Inventor: Herbert Keith Morris, Kingsgrove, New South Wales, Australia
[73] Assignee: Girling Limited, Tyseley, Birmingham, England
[22] Filed: Aug. 20, 1973
[21] Appl. No.: 389,524

[30] Foreign Application Priority Data
Sept. 1, 1972  Great Britain............... 40533/72

[52] U.S. Cl............................. 188/71.8, 188/196 P
[51] Int. Cl......................................... F16d 65/54
[58] Field of Search............ 188/71.8, 196 P, 196 B, 188/79.5 M, 79.5 GE

[56] References Cited
UNITED STATES PATENTS
3,574,324   4/1971   Kellogg............................. 188/71.8

*Primary Examiner*—Duane A. Reger
*Attorney, Agent, or Firm*—Scrivener, Parker, Scrivener and Clarke

[57]  ABSTRACT

A hydraulic actuator for a reaction type spot type disc brake is provided with an anti-knock back device. The anti-knock back device comprises a strut and a split ring resiliently clamped about an external cylindrical surface of the strut. The strut is biased by a spring against one component of the actuator, such as a piston or the end wall of a cylinder, and is sealingly guided in the other actuator component, such as a piston. The split ring has limited axial play between a wedging surface and an abutment in said other actuator component to correspond to the desired brake slack. If the brake travel is excessive the abutment slides the split ring along the strut. It is prevented from sliding back in the opposite direction by the camming action of the wedging surface. The spring is overcome at a relatively low pressure to render the anti-knock back device substantially load insensitive.

8 Claims, 2 Drawing Figures

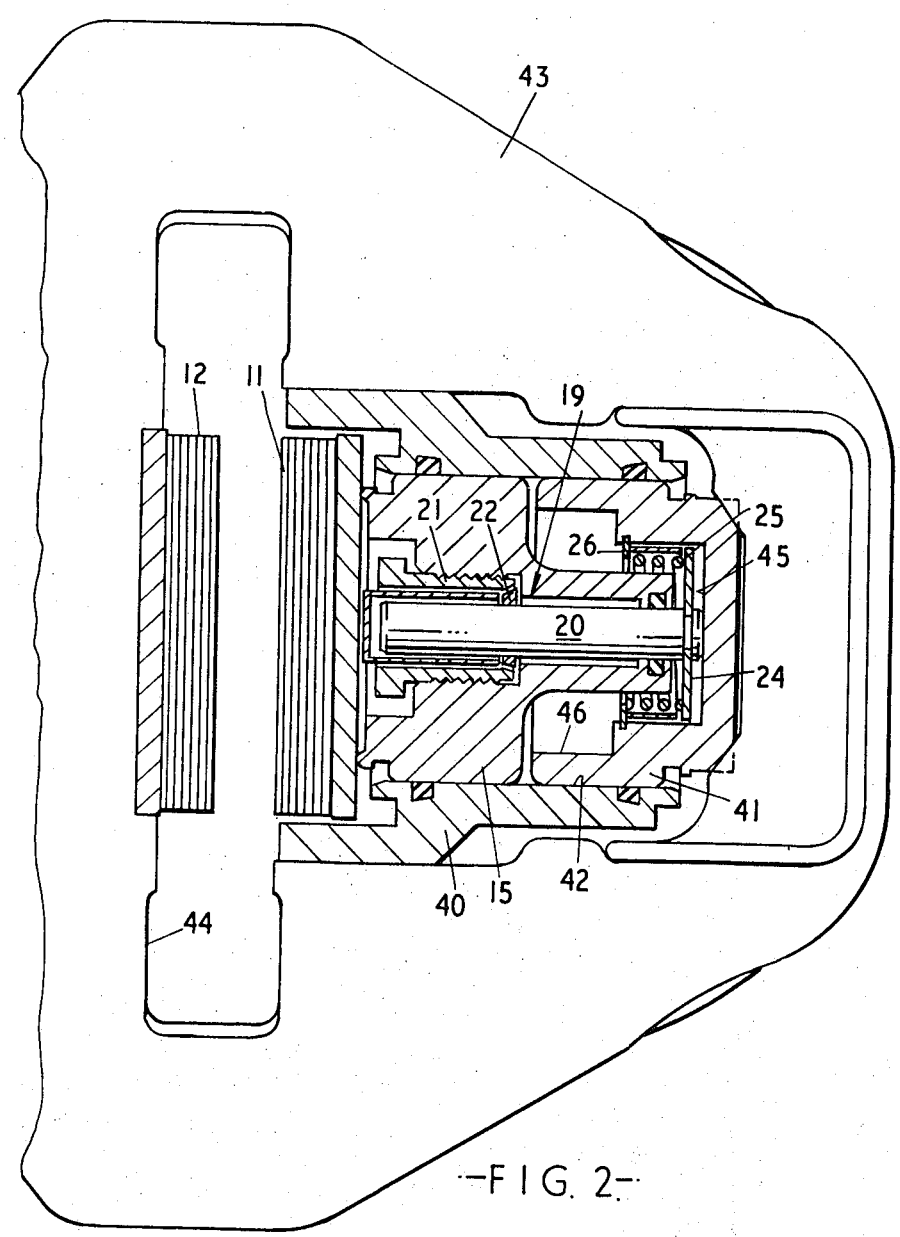
-FIG. 2-

VEHICLE BRAKES

The present invention relates to hydraulic actuators for spot-type disc brakes, and more particularly to an automatic adjusting device for preventing piston knock back.

When a hydraulic actuator for a disc brake is fitted with an auxiliary mechanical actuator (handbrake) it has been customary to provide an automatic adjuster to take up the increased brake slack resulting from wear of the friction faces of the brake pads. It has not been customary to fit automatic adjusters to hydraulic actuators not fitted with an auxiliary mechanical actuator, for example, for the front brakes of a vehicle, as it has been found that the friction at the piston seals prevents excessive retraction of the pistons. However, such disc brakes suffer from knock back or shake back. Knock back occurs when the disc is deflected, for example, on cornering such that the disc strikes the friction pad associated with the piston and, in so doing, knocks the piston back into its cylinder bore. This means that the next time the brake is applied, there is excessive pedal travel, and it may be necessary to pump the brake in order to achieve satisfactory braking.

It is a feature of the present invention to provide an anti-knock back device which is automatically adjusting, and which is insensitive to the extent of application of the brake, i.e. insensitive to the brake load.

According to the present invention, an anti-knock back device for a hydraulic actuator for a spot-type disc brake is operative between two components of the actuator relatively movable apart by the application of hydraulic pressure therebetween and comprises first and second relatively movable members one of said members being biased by a spring for movement with one of said actuator components and being sealingly guided in the other of said actuator components such that the hydraulic pressure between said components acts on said one member in opposition to said spring and the other of said members being fixed to or integral with said other actuator component, and a split ring engaged with a cylindrical surface on said first member under the resilience of said ring and movable relatively to said second member by a distance equal to the desired brake slack, the split ring and said second member having cooperating wedging surfaces, the arrangement being such that engagement between said wedging surfaces, as when the actuator components are knocked towards one another or the hydraulic pressure exceeds a predetermined value at which said spring is overcome, prevents the split ring sliding back on said first member but the force required to push the split ring forward on said first member when there is no engagement between said wedging surfaces is lower than the force of said spring.

Thus, when the brake is first applied and the brake pressure is insufficient to overcome the force of the spring, said one member is constrained by the spring to move with said one component of the actuator. As soon as pad wear has taken place, the relative displacement between the two members at pressures below the predetermined pressure at which the spring force is overcome causes the split ring to engage an abutment so that the split ring is pushed slightly forward along said one member. When the brake pressure is fully released the relative return travel of the actuator components is limited by the wedging surface on the split ring engaging that on said other member. Due to the wedging action the split ring cannot be pushed back along said one member.

The invention is further described, by way of example, with reference to the accompanying drawings, in which:

FIG. 1 is a sectional elevation of a sliding caliper disc brake in accordance with one embodiment of the invention; and FIG. 2 is a sectional plan of a sliding caliper disc brake in accordance with a second embodiment of the invention.

Referring to FIG. 1, a spot-type disc brake has a mounting bracket 10 by which the brake can be fixed with a directly operated brake pad assembly 11 and an indirectly operated brake pad assembly 12 arranged at opposite sides of a brake disc (not shown). The pad assembly 12 is secured to a caliper 13 slidably mounted by means (not shown) on the bracket 10. The limb of the caliper 13 remote from the pad assembly 12 houses a hydraulic actuator 14 which comprises a piston 15 slidable in a blind bore 16 in the caliper 13. The pad assembly 11 is secured to the piston 15. A seal 17 seals the piston 15 to the bore 16.

To operate the brake, hydraulic fluid is applied to the space 18 at the righthand side of the piston 15. On brake release, the piston 15 retracts into the bore 16 just so far as to relieve the pressure at the friction faces of the pad assemblies 11 and 12. The piston 15 is prevented from retracting further into the bore 16 by the friction developed at the seal 17. However, it may happen that, due to disc deflection, the piston 15 is actually knocked back further into the bore 16 since fluid can be displaced from the space 18 back through the master cylinder into the brake fluid reservoir when the brake is not applied. To prevent this, the actuator 14 is provided with an anti-knock back device 19.

The anti-knock back device 19 comprises a strut 20, a collar 21 and a split ring 22. The strut 20 is cylindrical and the split ring 22 is in frictional engagement with the cylindrical surface of this strut under the resilience of the ring. The strut 20 is slidable in a bore 23 in the piston 15 and, at its end within the space 18, is provided with a flange 24 which is in the form of a washer firmly captive on the end of the strut 20. A spring 25 acts between a split ring 26 retained in a reduced diameter portion 27 of the bore 16 and the flange 24 and biases the strut 20 against the base 28 of the blind bore 16. A sealing ring 29 seals the strut 20 to the piston bore 23.

The split ring 22 has an external conical surface which cooperates with an internal conical surface inside the collar 21. The collar 21 is screwed into a larger diameter portion 30 of the bore 23 in the piston 15. The split ring 22 cooperates with a shoulder 31 formed in the piston 15. Thus, leftward movement of the split ring 22 relative to the piston is limited by the conical surfaces and the rightward movement is limited by the shoulder 31. The desired brake slack is determined by such permitted axial movement and can be preadjusted by screwing the collar 21 into or out of the piston.

When the brake is applied the hydraulic pressure moves the piston 15 to the left relative to the caliper 13. The hydraulic pressure also acts to the left on the strut 20, but the strut 20 is constrained by the spring 25 to move first of all with the caliper. The spring 25 is dimensioned relative to the diameter of the strut 20 such that at a predetermined relatively low hydraulic pressure at which the braking force is slight and the deflection of the caliper 13 is negligible, the force due to the pressure acting on the strut 20 overcomes the force of the spring 25 and urges the strut 20 to the left until the conical surface on the ring 22 engages the conical surface on the collar 21, whereafter the strut moves with the piston with further increasing hydraulic pressure. The wedging action at the conical surfaces urges the split ring 22 more positively into frictional engagement with the strut 20 so that the ring does not slide along the strut. The converse happens upon brake release.

Upon brake wear taking place while the brake is applied, the piston 15 will not retract into the bore 16 quite so far on release before the brake pressure has fallen to the above mentioned predetermined value whereupon the strut 20 is moved to the right. However, due to the brake wear the ring 22 engages the shoulder 31 before the strut 20 engages the base 28 of the blind bore in the cylinder. The force of the spring 25, however, is sufficient to draw the strut onto the base of the blind bore, thus pushing the ring 22 along the strut 20 a distance corresponding to the extent of lining wear. As the brake pressure is finally dissipated, the piston 15 further retracts into the bore 16 to an extent which is limited by the collar 21 engaging the conical outer surface of the split ring 22. Such engagement prevents knock back because the interengaging conical surfaces act on the split ring 22 to urge it more positively into frictional engagement with the strut 20.

An annular member 32 surrounds the spring 25 and is arranged between the split ring 26 and the flange 24. This annular member 32 limits the relative movement between the strut 20 and the base 28 of the blind bore should the spring 25 fracture.

A tool in the form of a cup-shaped member 33 is fitted over the free end of the strut 20 and serves for resetting the device. Thus, the cup-shaped member 33 can be pushed against the lefthand face of the split ring 22 to push it to the right along the strut 20. The piston 15 cannot simply be pushed back into the bore because of the above described wedging action of the conical surfaces.

The collar 21, although screwed into the piston, can be regarded as being part of the piston since these two elements do not normally move relative to one another.

FIG. 1 illustrates the invention as applied to a device fitted between a piston and a cylinder of a hydraulic actuator.

FIG. 2 of the drawings shows substantially the same device 19 fitted to a different embodiment of disc brake. In FIG. 2 the disc brake comprises a fixed body member 40 housing an actuator which comprises opposed pistons 15 and 41 slidable in a through bore 42 in the body member 40. A caliper in the form of a plate-like yoke 43 is slidably mounted in grooves along opposite sides of the body member 40, and has an opening 44 through which protrudes the rim of the disc (not shown). The piston 15 acts on a directly operated pad assembly 11 whereas the yoke 43 acts on the indirectly operated pad assembly 12. The piston 41 acts on the yoke 43. The principal difference between the use of the device 19 in FIG. 2 compared with that in FIG. 1 is that the spring 25 biases the strut 20 against the base 45 of a blind bore 46 in the piston 41. Other parts like those of FIG. 1 are denoted by like reference numerals.

The operation of the device in FIG. 2 is identical to that in FIG. 1. In FIG. 2 the two relevant actuator components are the pistons 15 and 41. It would be possible for the device 19 to be arranged the opposite way around, i.e. for the strut 20 to be sealingly received in the piston 41 and for the split ring 22 to cooperate with this piston and with a conical surface on a collar screwed into this piston. In this case, the spring 25 would bias the strut 20 against the base of a blind bore in the piston 15. Similarly, it would be possible for the device 19 in FIG. 1 to be arranged the other way around.

While the drawings show a split ring having an external conical surface and in engagement with the outer cylindrical surface of a strut, it would be possible for this split ring to have an internal conical surface and to be frictionally slidably arranged in a cylindrical longitudinal bore in the strut. In this case, the collar 21 would be replaced by a rod extending into the hollow bore in the strut.

It will be noted that the spring 25 serves to render the device 19 load insensitive. This is because the spring 25 is overcome at a relatively low fixed brake pressure at which the caliper deflection is negligible. Thus, variations in caliper deflection due to varying degrees of brake application will have no effect on the device 19.

The invention is not limited to the illustrated cases wherein the split ring 22 is in purely frictional engagement with the strut 20. Any means, such as serrations, may be employed which will ensure that the split ring does not move along the rod under vibration and which will sustain the axial force on the ring necessary to hold the ring in place until the wedging surfaces engage and develop a sufficient radial clamping force.

While the invention is illustrated as applied to sliding caliper disc brakes it is applicable to other reaction type disc brakes, such as swinging caliper disc brakes. A reaction type disc brake is one in which one component of the hydraulic actuator acts on one brake pad assembly at one side of the disc and the other actuator component acts indirectly via the caliper on another brake pad assembly at the other side of the disc.

I claim:

1. In a hydraulic actuator for a spot-type disc brake having two components relatively movable apart by the application of hydraulic pressure therebetween: an anti-knock back device is operative between said two components of the actuator and comprising first and second relatively movable members, a spring biassing one of said members for movement with one of said actuator components, means sealingly guiding said one member in the other of said actuator components such that the hydraulic pressure between said components acts on said one member in opposition to said spring and the other of said members being effectively part of said other actuator component, said first member having a cylindrical surface, a split ring engaged with said cylindrical surface on said first member under the resilience of said split ring, an abutment on said second member cooperating with said split ring, cooperating wedging surfaces on said split ring and said second member such that said split ring can move axially relatively to said second member by a distance equal to the desired brake slack, whereby engagement between said wedging surfaces, as when said actuator components are knocked towards one another or said hydraulic pressure exceeds a predetermined value at which said spring is overcome, prevents said split ring sliding back on said first member but the force required to push said split ring forward on said first member when there is no engagement between said wedging surfaces is lower than the force of said spring.

2. An actuator according to claim 1 in which said one member is said first member and said other member is said second member.

3. An actuator according to claim 2 in which said other actuator component comprises a piston.

4. An actuator according to claim 1 in which said spring comprises a compression spring acting between said one member and said one actuator component.

5. An actuator according to claim 4 which includes a further member disposed between said one member and said one actuator component to limit compression of said spring.

6. An actuator according to claim 5 in which said first member comprises a strut and said cylindrical surface is an external cylindrical surface on said strut and in which said wedging surfaces comprise an external frusto-conical surface on said split ring and an internal frusto-conical surface in said second member.

7. An actuator according to claim 6 which further includes a resetting tool which comprises a sleeve surrounding said strut and engageable with said split ring.

8. In a reaction type disc brake having a caliper and opposed brake pad assemblies, an actuator according to claim 1, said actuator being operative between one of said brake pad assemblies and said caliper, said caliper being operative upon the other of said brake pad assemblies.

* * * * *